(12) United States Patent
Hutten et al.

(10) Patent No.: US 11,024,089 B2
(45) Date of Patent: Jun. 1, 2021

(54) MACHINE LEARNING CURATED VIRTUALIZED PERSONAL SPACE

(71) Applicant: Wormhole Labs, Inc., Huntington Beach, CA (US)

(72) Inventors: Curtis Hutten, Laguna Beach, CA (US); Robert D. Fish, Tustin, CA (US)

(73) Assignee: Wormhole Labs, Inc., Huntington Beach, CA (US)

( * ) Notice: Subject to any disclaimer, the term of this patent is extended or adjusted under 35 U.S.C. 154(b) by 0 days.

(21) Appl. No.: 16/428,814

(22) Filed: May 31, 2019

(65) Prior Publication Data
US 2020/0380788 A1 Dec. 3, 2020

(51) Int. Cl.
| | |
|---|---|
| *G06T 19/00* | (2011.01) |
| *H04L 29/06* | (2006.01) |
| *G06F 3/01* | (2006.01) |
| *G06N 20/00* | (2019.01) |
| *A63F 13/822* | (2014.01) |

(52) U.S. Cl.
CPC .......... *G06T 19/006* (2013.01); *A63F 13/822* (2014.09); *G06F 3/011* (2013.01); *G06N 20/00* (2019.01); *H04L 67/38* (2013.01); *A63F 2300/8082* (2013.01)

(58) Field of Classification Search
CPC .. G06K 9/00664–00704; G06F 3/0481; G06F 3/04817; G06F 9/4443; G06F 3/04847; G06F 11/3664; G06F 3/012; G06F 3/0304; G06F 3/011–015; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

| | | | |
|---|---|---|---|
| 8,825,764 B2 | 9/2014 | Nowak | |
| 9,066,200 B1 | 6/2015 | Loxam | |
| 2002/0054176 A1* | 5/2002 | Ulrich | G06F 3/0481 715/864 |
| 2010/0060662 A1* | 3/2010 | Law | A63F 13/79 345/629 |

(Continued)

FOREIGN PATENT DOCUMENTS

WO 2018083668 A1 5/2018

OTHER PUBLICATIONS

NVIDIA AI turns crude doodles into photorealistic landscapes, https://www.engadget.com/2019/03/20/nvidia-ai-doodles-photorealistic/, Apr. 4, 2019, 11 pages.

(Continued)

*Primary Examiner* — Todd Buttram
(74) *Attorney, Agent, or Firm* — Fish IP Law, LLP

(57) ABSTRACT

The present inventive concept contemplates a method that of producing a walkabout reality for a user by extracting user-associated characteristics from social media interactions of the user, and using the user-associated characteristics to select a theme and corresponding theme elements from a theme data store. The invention further contemplates producing a virtualization of a current physical environment that includes the avatar of the user and corresponding theme elements. An augmented reality engine executes commands from the user to control actions of the avatar with the virtualization.

7 Claims, 4 Drawing Sheets

(56) References Cited

U.S. PATENT DOCUMENTS

| | | | | |
|---|---|---|---|---|
| 2010/0312739 | A1* | 12/2010 | Ramie | G06N 3/006 |
| | | | | 706/47 |
| 2014/0168216 | A1* | 6/2014 | Kim | G06T 17/00 |
| | | | | 345/420 |
| 2014/0204119 | A1 | 7/2014 | Malamud | |
| 2014/0310056 | A1* | 10/2014 | Alapati | G06K 9/00671 |
| | | | | 705/7.28 |
| 2017/0231560 | A1* | 8/2017 | Hyde | A61B 5/486 |
| | | | | 340/870.07 |
| 2017/0344116 | A1* | 11/2017 | You | G06F 3/016 |
| 2018/0012630 | A1* | 1/2018 | Thomee | G11B 27/28 |
| 2018/0143741 | A1* | 5/2018 | Uriostegui | G06F 40/30 |
| 2018/0165596 | A1* | 6/2018 | Abrams | G06N 3/006 |
| 2018/0174347 | A1* | 6/2018 | Chaney | G06T 13/40 |
| 2018/0350118 | A1* | 12/2018 | Bastaldo-Tsampalis | |
| | | | | G06T 19/006 |
| 2019/0050494 | A1* | 2/2019 | Rao | G06F 16/9577 |
| 2019/0156953 | A1* | 5/2019 | Chen | G16H 50/30 |
| 2019/0208418 | A1* | 7/2019 | Breu | H04L 9/3239 |
| 2019/0266651 | A1* | 8/2019 | Ndolo | G06Q 10/1097 |
| 2020/0114263 | A1* | 4/2020 | Vange | A63F 13/216 |

OTHER PUBLICATIONS

International search report dated Sep. 24, 2020, for related PCT application No. PCT/US20/35390. 10 pages.

Ferrise, Francecso; et al. "Prototyping Strategies for Multisensory Product Experience Engineering," Journal of Manufacturing. 2017. 14 pages.

\* cited by examiner

MACHINE LEARNING CURATED VIRTUALIZED PERSONAL SPACE

FIELD OF THE INVENTION

The field of the invention is mixed and extended reality environments.

BACKGROUND

Present day mixed reality environments rely on preset environments and models. Even in augmented reality systems with more complex environment building engines, the customization is limited to preconfigured options. For example, games like The Sims™ allow a player to create a personalized space, but the customization is limited to the preconfigured options in-game. As augmented reality environments and our real social lives continue to mesh, personalized augmented reality environments tuned to a user's personal tastes will increase in demand, much like the demand for personalized home décor.

The present invention enables individuals to personalize their own augmented reality spaces to suit their personal tastes. As augmented reality environments are dynamic and can be changed with relatively little effort through software, the present invention contemplates dynamically changing a user's augmented reality environment. In one contemplated embodiment, the present invention applies machine learning techniques to extract the most relevant information about a user in order to make decisions about the appearance of augmented reality spaces. By constantly evolving and adapting to the user, machine learning techniques assist in creating dynamic augmented reality spaces that reflect the user's changing preferences and tastes.

WIPO Patent Application No. WO 2018/083668 A1 to Rezende teaches the use of a neural network make inferences about videos and crops of particular images. Rezende takes the inferences and outputs a numeric representation representing the inferences. Rezende contemplates analyzing a scene using machine learning techniques but fails to contemplate generating a user-customized scene using information derived from machine learning.

Other art-based AI, such as Deep Dream Generator and nVidia™ GauGAN image creator, use artificial intelligence and machine learning techniques to generate pictures. However, Deep Dream Generator fails to customize the art to a particular individual's tastes and preferences. Additionally, GauGAN fails to automatically customize art to a user's preferences. Instead, GauGAN requires active user input to create photo realistic scenes.

Rezende and all other extrinsic materials discussed herein are incorporated by reference to the same extent as if each individual extrinsic material was specifically and individually indicated to be incorporated by reference. Where a definition or use of a term in an incorporated reference is inconsistent or contrary to the definition of that term provided herein, the definition of that term provided herein applies and the definition of that term in the reference does not apply.

Thus, there is still a need for mixed reality systems with artificial intelligence customized appearance and functionalities.

SUMMARY OF THE INVENTION

The inventive concept herein contemplates virtual reality, augmented reality, and/or mixed reality environments that are dynamically customized to a user's preferences using machine learning techniques. It is contemplated that one or more customizable elements can be dynamically changed to fit a theme associated with a user's preferences and behaviors. It is further contemplated that the customizable elements can be personalized from data collected from any number and variety of sources, including, for example, social media data, browsing data, and purchase history data.

The present invention further contemplates artificial intelligence-based functionalities. For example, a user can create interactive elements in their augmented reality space that automatically change based on the circumstances of the user. It is contemplated that AI-based customization of a user's AR space can be performed on a substantially real-time basis. However, the present invention is not limited to real-time applications and can be implemented in a continuous, intermittent, and/or random fashion.

Various resources, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer-based scheduling system, various alternative configurations are also deemed suitable and may employ various computing devices including servers, interfaces, systems, databases, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclose apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including allowing users to create personalized mixed reality environments for others to access. Mixed reality environments can include any combination of virtual and augmented reality environments and can be connected to each other in any manner.

For the purposes of this application, augmented reality environments can be associated with sub-environments, which can comprise any one or more of an augmented reality, a virtual reality, and any other interactive media format. For example, a primary sub-environment can be a first augmented reality, and a secondary sub-environment can be a second augmented reality connected to the first through a portal.

As used herein, "mixed reality" comprises the merging of real and virtual worlds to produce new environments and visualizations where physical and digital objects co-exist and interact in real time. Additionally and as used herein, "extended reality" comprises real-and-virtual combined environments and human-machine interactions generated by computer technology.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
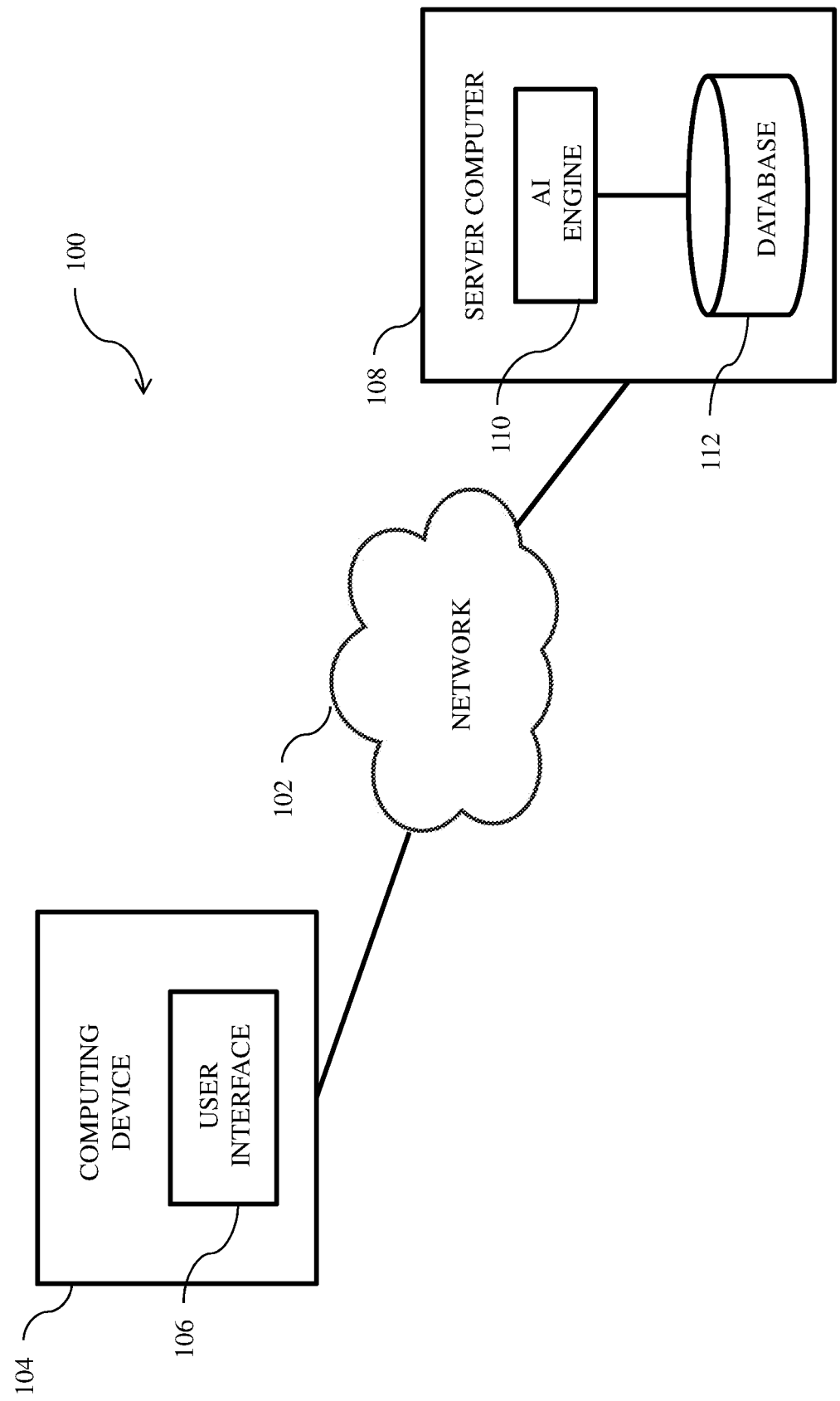
FIG. 1 is a functional block diagram illustrating a distributed data processing environment.

FIG. 1 is a functional block diagram illustrating a distributed data processing environment.

The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 104 and server computer 108, interconnected over network 102. Network 102 can include, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 104, server computer 108, and any other computing devices (not shown) within distributed data processing environment 100.

It is contemplated that computing device 104 can be any programmable electronic computing device capable of communicating with various components and devices within distributed data processing environment 100, via network 102. It is further contemplated that computing device 104 can execute machine readable program instructions and communicate with any devices capable of communication wirelessly and/or through a wired connection. Computing device 104 includes an instance of user interface 106.

User interface 106 provides a user interface to AR engine 110. Preferably, user interface 106 comprises a graphical user interface (GUI) or a web user interface (WUI) that can display one or more of text, documents, web browser windows, user option, application interfaces, and operational instructions. It is also contemplated that user interface can include information, such as, for example, graphics, texts, and sounds that a program presents to a user and the control sequences that allow a user to control a program.

In some embodiments, user interface can be mobile application software. Mobile application software, or an "app," is a computer program designed to run on smart phones, tablet computers, and any other mobile devices.

User interface 106 can allow a user to register with and configure AR engine 110 (discussed in more detail below) to enable artificial intelligence engine to find and predict patterns of user behavior. It is contemplated that user interface 106 can allow a user to provide any information to AR engine 110.

Server computer 108 can be a standalone computing device, a management server, a web server, a mobile computing device, or any other computing system capable of receiving, sending, and processing data.

It is contemplated that server computer 108 can include a server computing system that utilizes multiple computers as a server system, such as, for example, a cloud computing system.

In other embodiments, server computer 108 can be a computer system utilizing clustered computers and components that act as a single pool of seamless resources when accessed within distributed data processing environment 100.

Database 112 is a repository for data used by AR engine 110. In the depicted embodiment, AR engine 110 resides on server computer 108. However, database 112 can reside anywhere within a distributed data processing environment provided that AR engine 110 has access to database 112.

Data storage can be implemented with any type of data storage device capable of storing data and configuration files that can be accessed and utilized by server computer 108. Data storage devices can include, but are not limited to, database servers, hard disk drives, flash memory, and any combination thereof.

Figure 2:
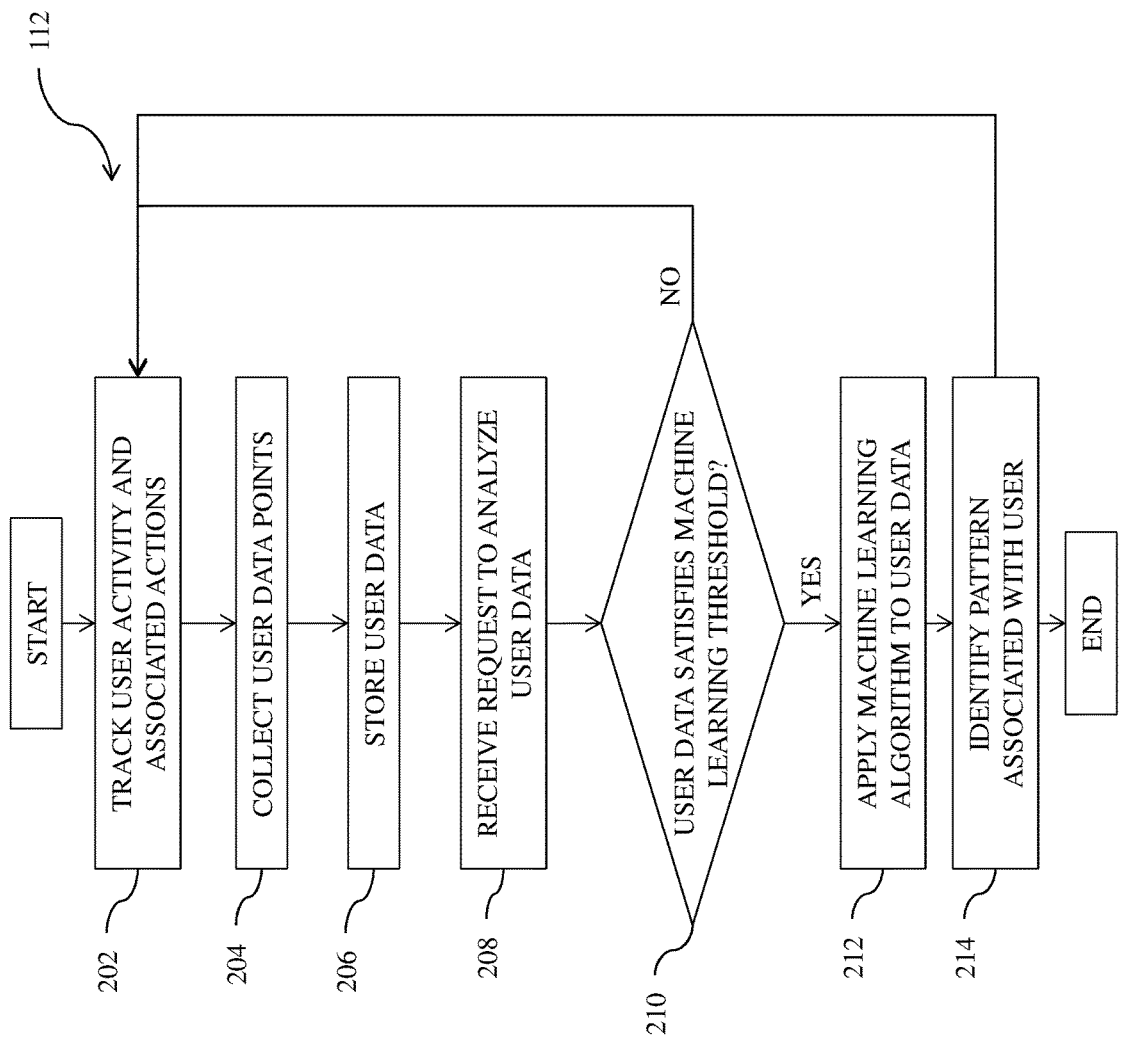
FIG. 2 is a schematic of a method of predicting user preferences and behavior using machine learning.

FIG. 2 is a schematic of a method of predicting user preferences and behavior using machine learning.

AR engine 110 tracks user activity and associated actions (step 202).

It is contemplated that AR engine 110 can track user activity and associate actions directly. For example, AR engine 110 can track user activity in proprietary software. It is further contemplated that AR engine 110 can utilize tracked activity by a third party. For example, AR engine 110 can access data from a first database associated with a social network, a second database storing browsing data from a particular web browser, and a third database containing census data.

In one embodiment, AR engine 110 passively collected user activity and tracks associated actions. It is contemplated that AR engine 110 can collect user activity associated with any one or more data sources known in the art.

In one example, AR engine 110 can track user browsing activity to gather data on the types of websites visited by the user, the genres of media that the user consumes, the media formats most viewed by the user, and the amount of time the user spends on particular web pages.

In another example, AR engine 110 tracks when a user plays a video game and the genre of video game being played. In a more specific example, AR engine 110 can track the duration, time, and date of a user's gaming sessions associated with a horror survival game.

In yet another example, AR engine 110 can track user social media activity. In a more specific example, AR engine 110 can track which social groups a user is a member, the demographics of the user's social media connections, and subjects that the user comments most frequently on.

In another embodiment, AR engine 110 tracks data associated with other users interacting with an augmented reality environment of a primary user. For example, AR engine 110 can track the total amount of times that avatars visiting and augmented reality space interact with a particular object.

In another example, AR engine 110 can track the demographics of the users associated with avatars that enter the AR environment of the primary user, the interactive objects that the avatars engage with, and the way in which avatars interact with the interactive objects. In a more specific example, AR engine 110 can identify whether an avatar looks more closely at a particular object and track the reaction of the avatar to the particular object.

AR engine 110 collects user data points (step 204).

In one embodiment, AR engine 110 collects user data points continuously. For example, AR engine 110 can collect user website browsing data in substantially real-time at all times. In another example, AR engine 110 can collect a user's statistics for a video game in substantially real-time at all times.

In other embodiments, AR engine 110 collects user data point subject to one or more rules. For example, AR engine 110 can be restricted to collecting data only when a user is actively streaming their game play on a video streaming platform. In another example, a user can set forth privacy rules that controls what types of data can be collected about a user and the manner in which the data is collected. More specifically, the user can restrict AR engine 110 to collecting user data only during the hours of 8:00 AM-4:00 PM local time and limit data collected to web browsing history, game play data, and social media data.

AR engine 110 stores collected user data (step 206).

AR engine 110 can store collected user data in any manner known in the art.

In one embodiment, AR engine 110 stores collected user data on a local data store, such as database 112. For example, AR engine 110 can store collected user data on a solid-state hard drive in a computer that executes AR engine 110.

In another embodiment, AR engine 110 stores collected user data in a distributed data network. For example, AR engine 110 can store collected user data in multiple remote servers over a cloud-based data storage infrastructure.

Further, it is contemplated that AR engine 110 can manipulate, add, or delete user data in any manner known in the art. In one embodiment, AR engine 110 can automatically categorize collected user data and store the collected user data in different category specific databases. In another embodiment, AR engine 110 can automatically delete data that constitutes a statistical outlier of data collected in a preceding 24-hour period. In yet another embodiment, AR engine 110 can add metadata to collected user data to include the time, date, and geolocation when the user data was collected.

AR engine 110 receives a request to analyze user data to identify a user behavior and/or preference pattern (step 208).

It is contemplated that AR engine 110 can receive a request to analyze user data in any manner known in the art.

In one embodiment, AR engine 110 receives a request to analyze user data from the user. For example, a user can select a button on user interface 106 to initiate a data analysis of stored user data. In a more specific example, a video game streamer can initiate a data analysis of game performance statistics for a particular title in order to eventually post the results of the analysis (e.g., a overall win-loss ratio in a fighting game, win-loss ratio associated with particular fighters, and number of finishing blows) in the user's AR space.

In another embodiment, AR engine 110 does not receive a request to analyze user data, and continuously analyzes user data. For example, AR engine 110 can analyze a users search and browsing history at all times.

In another embodiment, AR engine 110 receives a request to analyze user data intermittently at predetermined points. For example, a user can restrict AR engine 110 to collecting social media data and game play data only between the hours of 9:00 AM-5:00 PM.

AR engine 110 determines whether an amount of collected user data is sufficient to satisfy a machine learning threshold (decision block 210).

It is contemplated that the machine learning threshold can be any point at which AR engine 110 can identify a pattern in the data. It is further contemplated that the machine learning threshold can be preset.

In one embodiment, AR engine 110 automatically determines whether an amount of collected data is sufficient to satisfy the machine learning threshold. For example, AR engine 110 can, at the end of a second week of collecting user data, identify user behavioral patterns for a particular day of the week. In another example, artificial engine 110 can determine whether the amount of collected data is sufficient based on whether the amount of collected data is sufficient to predict user behavioral patterns above a particular threshold, for example, a 70% confidence interval.

In another embodiment, AR engine 110 determines whether the amount of collected user data is sufficient to satisfy the machine learning threshold based on a preset threshold by a third party. For example, AR engine 110 can determine that the amount and type of data collected satisfies requirements set for by an administrator requiring at least 1000 data points in a social media database, a browsing history database, and a financial transactions database within the last 3 months.

Responsive to determining that the amount of collected user data does not meet the machine learning threshold ("NO" branch, decision block 210), AR engine 110 returns to track user activity and associated actions (step 202).

Responsive to determining that the amount of collected user data satisfies the machine learning threshold ("YES" branch, decision block 210), AR engine 110 applies one or more machine learning algorithms to the collected user data (step 212).

Using a descriptive analytical framework, AR engine 110 can analyze the data to quantitatively describe the main trends in a collection of data.

Using an exploratory analytical framework, AR engine 110 can analyze data sets to find previously unknown relationships. For example, AR engine 110 can use one or more algorithms, including, for example, machine learning algorithms such as time-series forecasting, supervised learning classifiers, and linear regression analyses, to determine a connection between two seemingly unrelated user data points (e.g., finding a connection between a predominantly red and gold color scheme in the user's augmented reality space and more views/money spent from East Asian countries).

Using an inferential analytical framework, AR engine 110 can analyze a representative subgroup of data sets to make inferences about a bigger population. For example, AR engine 110 can analyze a data set representing user color preferences and textile preferences in clothing purchases, in order to determine color schemes and fabrics to represent in the user's AR space.

Using a predictive analytical framework, AR engine 110 can analyze current and historical data to make predictions about future events. Predictive analytical frameworks can include the use of supervised learning classifiers, time-series forecasting, and any other machine-learning algorithms.

In one example, AR engine 110 can review viewer comments about different types of games that a user plays on a video game stream. Based on the analysis, AR engine 110 can predict what types of games that viewers enjoy playing the most, and correspondingly insert promotional materials from games of upcoming games in the same or similar genre into the user's AR space.

It is contemplated that using supervised learning classifiers allows AR engine 110 to make inferences from the data based on what is taught by the training data in order to analyze unexpected situations in a more reasonable way (e.g., come to conclusions that a human being might come to). Training data can include data that is collected by AR engine 110 and data that is directly inputted by a user.

In another example, AR engine 110 can use time-series forecasting to predict the seasonality of particular visual themes. For example, AR engine 110 can determine that lighter color choices for a user's AR space historically increase viewership of the user during the summer months.

Using a causal analytical framework, AR engine 110 can adjust one variable in a real or hypothetical situation to determine how it affects another variable. For example, AR engine 110 can determine how reducing the presence of particular branded virtual objects affects the sales of a connected brands (e.g., whether the inclusion of virtual video game characters from a specific series would lead to an increase in sales of a different game series from the same publisher). It is contemplated that the causal analysis in the preceding example can help determine how third parties in the user's augmented reality space make purchasing decisions.

In some embodiments, AR engine 110 can use a mechanistic analytical framework, which is used to understand the exact effects of how changing a variable leads to changes in other variables for one or more inventory items.

AR engine 110 identifies a pattern associated with the user (step 214).

Figure 3:
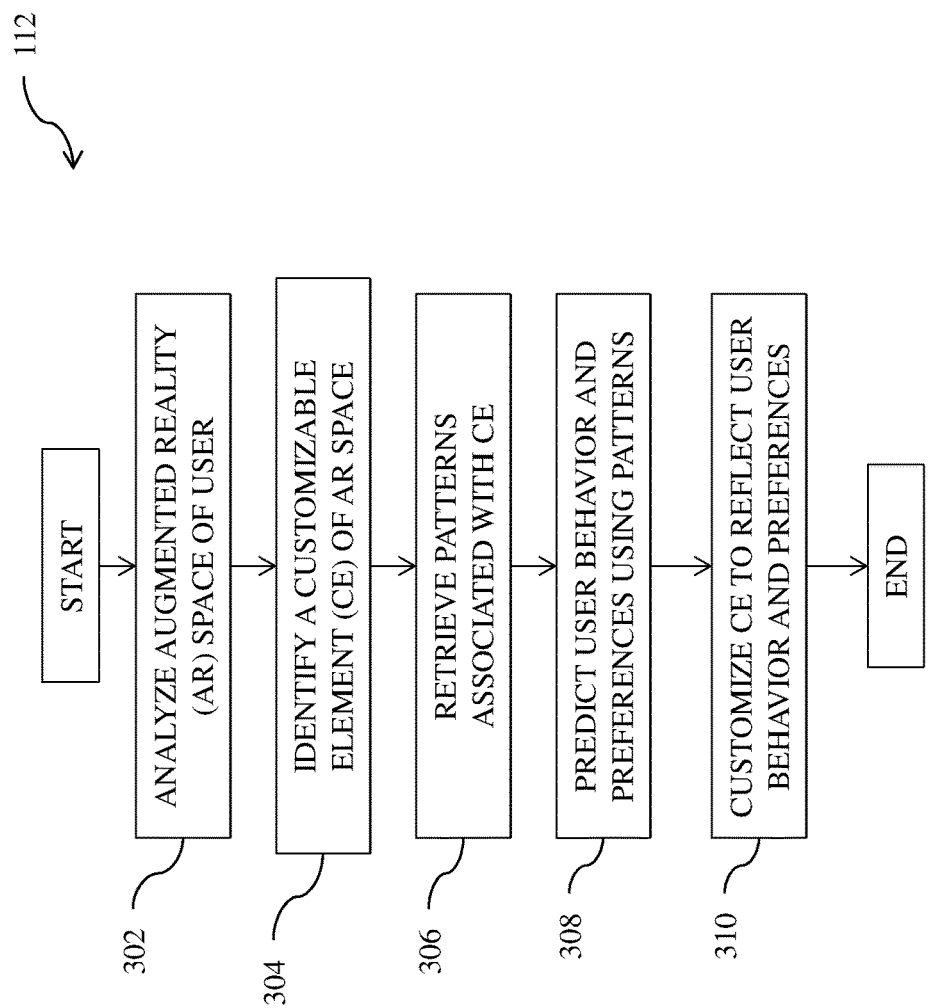
FIG. 3 is a schematic of a method of customizing an augmented reality space based on predicted user preferences and behaviors.

FIG. 3 is a schematic of a method of customizing an augmented reality space based on predicted user preferences and behaviors.

It is contemplate that the augmented reality space is traversable by the user and any additional users in the AR space. Any user in the AR space is contemplated to be represented by any one or more of an non-representative user avatar, a representative user avatar, no avatar, and any other means of visually representing a user known in the art. Non-representative user avatars are contemplated to include completely fictional avatars or heavily modified 3D representations of the user. Representative user avatars are contemplated to include true-to-life representations of a user or minimally modified 3D representations of the user. Minimally modified, as used herein, is any modification that does not obscure the physical appearance and identity of the user.

AR engine 110 analyzes an augmented reality (AR) space of the user (step 302).

It is contemplated that the local environment about a user can be constructed into an AR space in any manner known in the art. For example, techniques including, but not limited to, 3D scanning, stitching of individual photos, and user inputted 3D representations of the AR environment can be used to construct a user's AR space. It is further contemplated that, in some embodiment, the AR space can be completely virtual and not reflect the local environment of the user.

In one embodiment, AR engine 110 analyzes the AR space to automatically identify one or more features of the AR space. For example, AR engine 110 can identify that the space comprises a west-facing window, a table, three computer monitors, a bed, a couch, and multiple pieces of art on a wall.

In some embodiments, AR engine 110 can identify one or more features of the AR space using one or more of the machine learning techniques discussed in further detail above. For example, AR engine 110 can use a supervised learning classifier to mine data from search engine image databases to learn particular combinations of features unique a set of objects.

Based on the mined data and application of the supervised learning classifier, AR engine 110 can determine then identify one or more features of the AR space automatically (e.g., identifying a chair by identifying an object with three or more legs, a platform connected to the legs, and a backrest).

In other embodiments, AR engine 110 receives input from a user regarding the features in the AR space. For example, a user can view a stitched-together AR space and manually select particular elements shown in the space and input data associated with the identity of those particular elements into user interface 106.

AR engine 110 identifies a customizable element of the AR space (step 304).

In one embodiment, AR engine 110 analyzes the AR space to automatically identify one or more customizable elements of the AR space. For example, AR engine 110 can identify that, of a space comprising a west-facing window, a table, three computer monitors, a bed, a couch, and an art piece on a wall, the table and the art piece are customizable elements. Customizable elements are contemplated to be any features of a user's AR space that can be visually, auditorily, and/or haptically modified using AR engine 110.

In some embodiments, AR engine 110 can identify one or more customizable elements of the AR space using one or more of the machine learning techniques discussed in further detail above. For example, AR engine 110 can use a supervised learning classifier to mine data from search engine image databases to learn types of objects that are used to present visual information. Based on the machine learning analysis, AR engine 110 can automatically identify that televisions, tables, décor items, and picture frames are all customizable elements because they can be used as a medium to present user-specific aesthetic tastes and information.

In other embodiments, AR engine 110 receives input from a user regarding the features in the AR space. For example, a user can view a stitched-together AR space and manually select particular elements shown in the space and input data associated with the identity of those particular elements into user interface 106.

AR engine 110 identifies patterns associated with the user regarding the customizable element (step 306).

AR engine 110 can identify any one or more patterns associated with the customizable element customizable element In a first example, where the customizable element is a textile, AR engine 110 can identify that most textile-based purchases associated with the user are blue, white, and striped. AR engine 110 can also identify that the user most frequently plays nautical-themed video games during the current season.

In a second example, AR engine 110 can identify a table as the customizable element. Based on the patterns associated with the user and searches for tables, AR engine 110 can identify that the user most often uses the table for turn-based strategy board games. Based on patterns associated with user game play data, AR engine 110 can identify that the user plays turn-based strategy games most frequently between the hours of 1:00 PM and 6:00 PM on weekend nights.

In a third example, AR engine 110, AR engine 110 can identify an empty space in the corner of the AR space as a customizable element. AR engine 110 can also identify recent user searches about ancient Egypt, financial data showing purchases of tickets to Egypt themed exhibits, and interest in Egyptian home décor, and tie these finding to the empty space.

It is contemplated that any data associated with user preferences can be stored on a database, such as a theme data store, which comprises any thematic preferences associated with one or more user circumstances. For example, the theme of Egypt can include categories associated with "People", under that category, a ranked list can include King Tutankhamun as the highest ranked person under the Egypt theme. Upon identifying an empty chair in a user's room, AR engine 110 can use the information from the theme data store to make the decision to render King Tutankhamun sitting in the chair in the user's AR space.

AR engine 110 predicts user behavior and preferences using the predicted patterns of user behavior and preferences (step 308).

In the first example of step 308, AR engine 110 can predict, based on user patterns associated with the current season and gaming interests of the user, that the user will prefer textiles to be a mixture of blue and white and have a nautical theme.

In the second example of step 308, AR engine 110 can predict that the user will play a turn-based strategy game between the hours of 1:00 PM and 6:00 PM in the upcoming weekend.

In the third example of step 308, AR engine 110 can predict that the user will likely buy more Egypt-themed décor and that the user will have a preference for sculptures.

It should be noted that the examples herein are simpler example, but the present invention contemplates that any one or more machine learning techniques can be used independently or cooperatively to make prediction about a user.

AR engine 110 customizes the customizable element to reflect the predicted user behavior and preferences (step 310).

Based on resulting predictions of the first example of step 308, AR engine 110 can identify that the curtains (the customizable element) in the user's AR space will be a white and blue striped pattern with a repeating anchor depicted evenly across the surface.

Based on resulting predictions of the second example of step 308, AR engine 110 can place moving 3D renders of figurines from the user's most played turn-based strategy game on the surface of the table in the AR space.

Based on resulting predictions of the third example of step 308, AR engine 110 can place a virtual statue of the Sphinx in the empty corner of the room, such that fits within the empty space designated at the customizable element.

Figure 4:
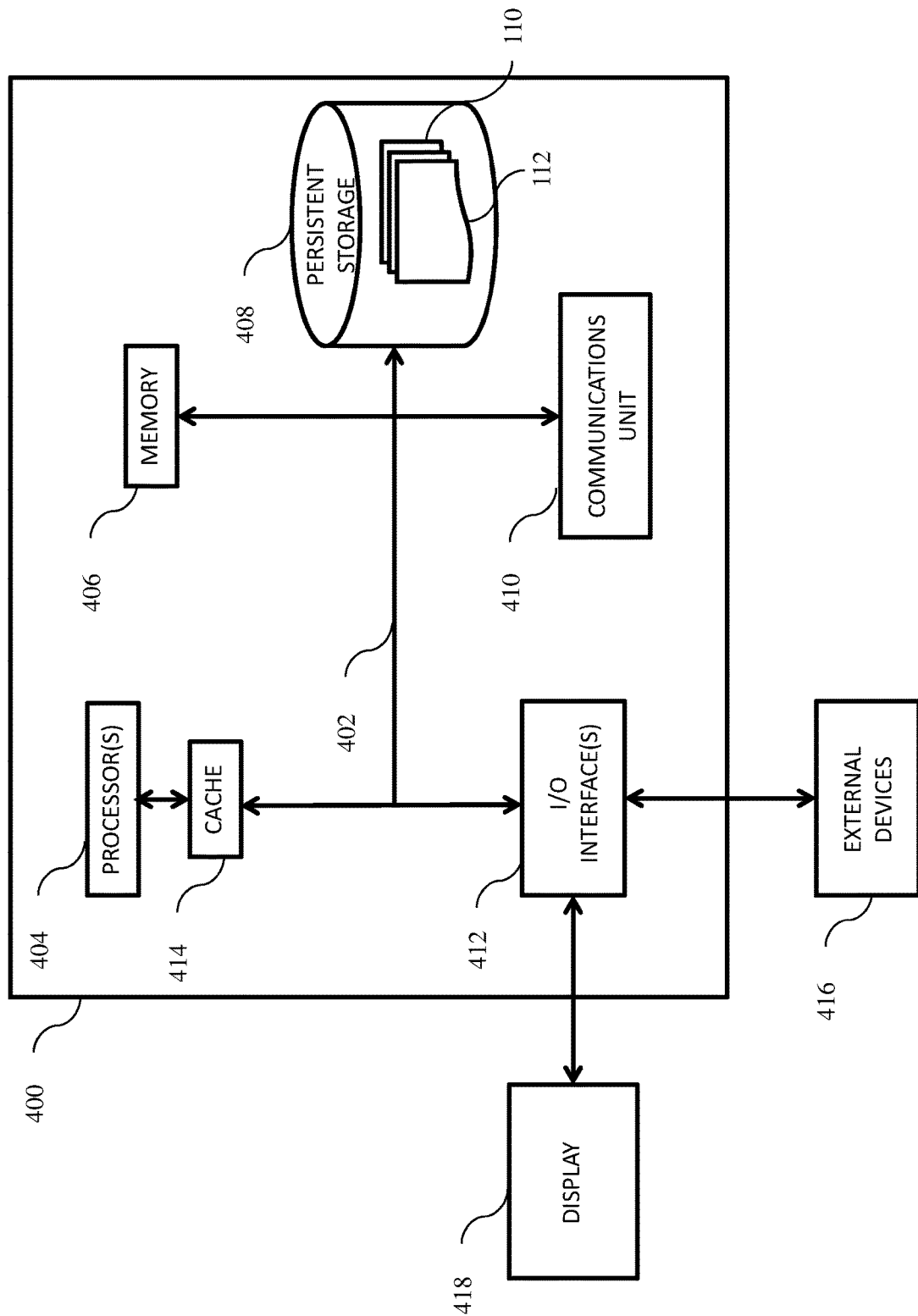
FIG. 4 depicts a block diagram of components of the server computer executing the AI engine within the distributed data processing environment of FIG. 1.

FIG. 4 depicts a block diagram of components of the server computer executing AR engine 110 within the distributed data processing environment of FIG. 1.

FIG. 4 is not limited to the depicted embodiment. Any modification known in the art can be made to the depicted embodiment.

In one embodiment, the computer includes processor(s) 404, cache 414, memory 406, persistent storage 408, communications unit 410, input/output (I/O) interface(s) 412, and communications fabric 402.

Communications fabric 402 provides a communication medium between cache 414, memory 406, persistent storage 408, communications unit 410, and I/O interface 412. Communications fabric 402 can include any means of moving data and/or control information between computer processors, system memory, peripheral devices, and any other hardware components.

Memory 406 and persistent storage 408 are computer readable storage media. As depicted, memory 406 can include any volatile or non-volatile computer storage media. For example, volatile memory can include dynamic random access memory and/or static random access memory. In another example, non-volatile memory can include hard disk drives, solid state drives, semiconductor storage devices, a read-only memory (ROM), an erasable programmable read-only memory (EPROM), a flash memory, and any other storage medium that does not require a constant source of power to retain data.

In one embodiment, memory 406 and persistent storage 408 are random access memory and a hard drive hardwired to computing device 104, respectively. For example, computing device 104 can be a computer executing the program instructions of AR engine 110 communicatively coupled to a solid state drive and DRAM.

In some embodiments, persistent storage 408 is removable. For example, persistent storage 408 can be a thumb drive or a card with embedded integrated circuits.

Communications unit 410 provides a medium for communicating with other data processing systems or devices, including data resources used by computing device 104. For example, communications unit 410 can comprise multiple network interface cards. In another example, communications unit 410 can comprise physical and/or wireless communication links.

It is contemplated that AR engine 110, database 112, and any other programs can be downloaded to persistent storage 408 using communications unit 410.

In a preferred embodiment, communications unit 410 comprises a global positioning satellite (GPS) device, a cellular data network communications device, and short to intermediate distance communications device (e.g., Bluetooth®, near-field communications, etc.). It is contemplated that communications unit 410 allows computing device 104 to communicate with other computing devices 104 associated with other users.

Display 418 is contemplated to provide a mechanism to display information from AR engine 110 through computing device 104. In preferred embodiments, display 418 can have additional functionalities. For example, display 418 can be a pressure-based touch screen or a capacitive touch screen.

In yet other embodiments, display 418 can be any combination of sensory output devices, such as, for example, a speaker that communicates information to a user and/or a vibration/haptic feedback mechanism. For example, display 418 can be a combination of a touchscreen in the dashboard of a car, a voice command-based communication system, and a vibrating bracelet worn by a user to communicate information through a series of vibrations.

It is contemplated that display 418 does not need to be physically hardwired components and can, instead, be a collection of different devices that cooperatively communicate information to a user.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of producing a walkabout reality for a user, comprising an augmented reality engine to execute the following steps:

extracting user-associated characteristics from user patterns of behavior in at least one of a social media environment and a physical environment;

analyzing a current physical environment to determine one or more customizable elements of the current physical environment, wherein the analysis of the current physical environment includes a supervised learning classifier configured to analyze historical physical environment data and characterize one or more features of the current physical environment;

rendering a virtualized current physical environment without a threshold distance of the user, wherein the rendered virtualized current physical environment includes an avatar of the user;

rendering one or more customized virtual elements within the virtualized current physical environment;

executing commands from the user to control actions of the avatar with the virtualization;

analyzing user interactions with the virtualized the current physical environment and the one or more customized virtual elements; and modifying one or more customized virtual elements in the virtualization of the current physical environment based on the analyzed user interactions.

2. The method of claim 1, wherein using the user-associated characteristics to select a theme and corresponding theme elements from a theme data store, further comprises applying one or more machine learning algorithms to the user-associated characteristics to identify a pattern associated with the identified theme.

3. The method of claim 1, further comprising applying the theme to produce a virtualization of a physical object within the current physical environment, and executing commands from the user to control actions of the avatar with respect to the virtualized physical object.

4. The method of claim 1, further comprising applying the theme to produce a virtualization of a physical object within the current physical environment, further comprises applying one or more auditory functionalities associated with a theme to the virtualized physical object.

5. The method of claim 1, further comprising applying the theme to produce a virtualization of a physical object within the current physical environment, further comprises applying one or more haptic functionalities associated with a theme to the virtualized physical object.

6. The method of claim 1, further comprising using at least one of search and purchase histories to derive the user-associated characteristics.

7. The method of claim 1, wherein the user-associated characteristics are derived from one or more data points.

\* \* \* \* \*

UNITED STATES PATENT AND TRADEMARK OFFICE
CERTIFICATE OF CORRECTION

Page 1 of 1

PATENT NO. : 11,024,089 B2
APPLICATION NO. : 16/428814
DATED : June 1, 2021
INVENTOR(S) : Curtis Hutten and Robert D. Fish It is certified that error appears in the above-identified patent and that said Letters Patent is hereby corrected as shown below:

In the Claims

Column 11 Line 40 In Claim 1 change, "without a threshold distance of the user, where the" to --within a threshold distance of the user, where the--

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*